United States Patent
Ofer et al.

[11] Patent Number: 5,829,048
[45] Date of Patent: Oct. 27, 1998

[54] RESET PROPAGATION FOR A MULTI-PORT STORAGE CONTROLLER

[75] Inventors: Erez Ofer, Brookline; John Fitzgerald, Mansfield; Yuval Ofek, Hopkinton, all of Mass.

[73] Assignee: EMC Corporation, Hopkinton, Mass.

[21] Appl. No.: 657,340

[22] Filed: Jun. 3, 1996

[51] Int. Cl.⁶ .................................................. G06F 13/14
[52] U.S. Cl. ............................................ 711/166; 711/156
[58] Field of Search .................................. 395/438, 439, 395/441; 711/111, 112, 114, 156, 166

[56] References Cited

U.S. PATENT DOCUMENTS 5,241,668  8/1993  Eastridge et al. .................. 395/182.03

*Primary Examiner*—Eddie P. Chan
*Assistant Examiner*—Kevin L. Ellis
*Attorney, Agent, or Firm*—Fish & Richardson P.C.

[57] ABSTRACT

A mass storage system having a storage controller connnecting a plurality of host computers to an array of disk drives provides a method and apparatus for propagating a reset command from the host computer to other host computers. The storage controller is used as the intermediary. When the host computers connect to the storage controller using standard bus protocols, certain commands such as a reset command can have profound effects on the storage system, but are not adequately communicated to other host computers connecting to the storage controller over separate bus channels. The storage controller either passes such reset commands to the other host computers or enables the other host computers to sense and request an updated status report from the storage controller indicative of a change in storage configuration or operation.

6 Claims, 3 Drawing Sheets

RESET PROPAGATION FOR A MULTI-PORT STORAGE CONTROLLER

BACKGROUND OF THE INVENTION

The invention relates generally to mass storage systems, and in particular, to a multi-port mass storage system independently connected to the host computer by separate communications buses.

To meet the growing memory needs of today's computer systems, and, simultaneously, to enable more than one computer processor to access the same stored data, disk drive controllers have been configured to enable two or more independent processors or hosts, through one or more ports, to access the same mass storage device(s). The mass storage device(s) can be one or a plurality of disk drives configured in accordance with a predetermined or selectable structure.

A typical approach to the multi-host access of a storage element provides, referring to FIG. 1, for two host processors and a storage element to each be connected to, for example, a common communications bus. In this environment, should the bus fail, none of the processor elements would have access to the disk drive. At a time when reliability has become of primary importance, and when continuous access and processing of data is paramount to the success of some businesses, disk drive manufacturers have responded to this (single point of failure) problem and have provided two or more independent ports. Thus the failure of the communications channel at one port will not prevent the host computer connected to another port from accessing the data stored on the disk drive(s).

SUMMARY OF THE INVENTION

The invention relates to a mass storage system in which the controller for providing access to the mass storage devices enables various functions enabling activities occurring at one host port to be communicated to the second port, or to be otherwise made available at the second host port. In particular, the invention relates to a mass storage system, and features a mass storage array having a plurality of mass storage devices, a storage controller for receiving commands and data from a host at a first port and for storing the data in the mass storage array, a first host for communicating data and commands over a first communications bus connected to the storage controller at the first port, and a second host for communicating data and commands over a second communications bus connected to the storage controller at a second port, each host being able to generate a device operation command to the storage controller, and the storage controller enabling one of the hosts to recognize that the storage controller received the device operation command from the other host. In a particular embodiment, the buses are SCSI buses and the device operation command is a reset command.

In a particular embodiment of the invention, the storage system controller features a global memory, readable from each of the first host and the second host, and a flag setting controller for setting a flag or semaphore in the global memory (and acting on a mailbox). Each host is then able to poll, in a continuous and periodic fashion, the storage controller global memory to determine whether the flag is set.

In another aspect of the invention, the storage controller features a reset relay system for responding to the reset signal from one host, and sending a signal to the other host indicating that the one host has sent a reset signal.

In this manner, therefore, once a host sends a reset signal, which forces certain disk drives connected to the storage controller to a defined preset initialization status, each other host having access to the reset device either receives the information from the storage controller or can poll the storage controller in a routine fashion to be made aware of the new status and state of the associated disk device. Without this information, the other hosts would be at a marked disadvantage with regard to operating with the storage array, and may waste substantial time issuing instructions deemed invalid by the storage controller or may unknowingly destroy or lose valuable data in the system.

BRIEF DESCRIPTION OF THE DRAWING

Other features and advantages of the claimed invention will be apparent from the following drawings in which:

DESCRIPTION OF THE PREFERRED PARTICULAR EMBODIMENTS

Figure 1:
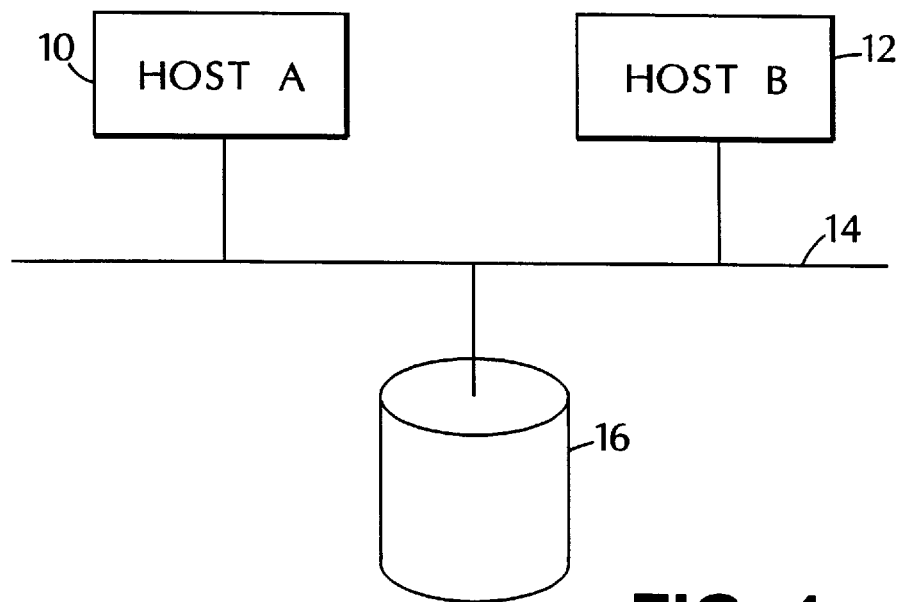
FIG. 1 is a block diagram of a typical prior art system.
Figure 2:
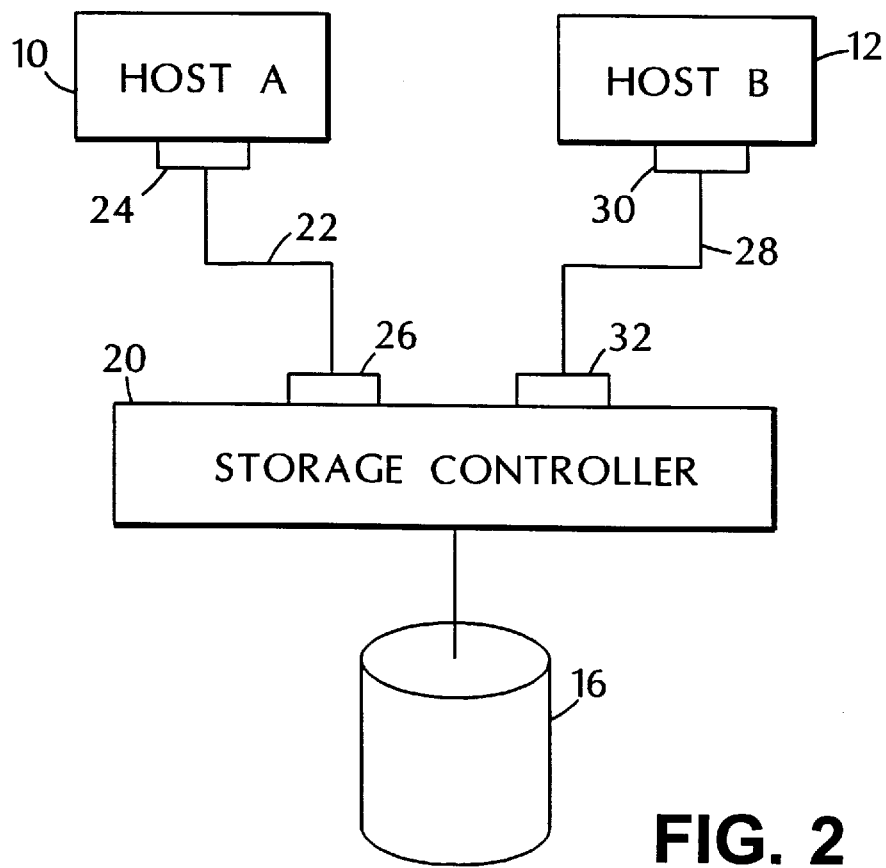
FIG. 2 is a block diagram of a modified disk drive controller/host computer configuration in accordance with the invention.

Referring to FIG. 1, in a typical prior art configuration, a first host computer 10 and a second host computer 12 are connected to a bus 14. A mass storage device, such as a disk drive 16, is also connected to the communications bus 14, which may be a SCSI bus. Accordingly, if communications bus 14 should fail, neither host 10 nor host 12 would have access to the data stored on the mass storage device 16. To remedy this situation, a separate communication channel was made available to both host 10 and host 12. Thus, referring to FIG. 2, in an improvement over the configuration of FIG. 1, host 10 is connected to a storage controller 20 over a communications channel 22 having appropriate termination elements 24 and 26. Similarly, host 12 is connected to the storage controller 20 over a communications channel 28. Communications channels 22 and 28 are independent of each other. As before, appropriate terminations 30 and 32 are provided for the interface of communications channel 28 to the host and storage controller. The storage controller controls one or more mass storage elements such as a disk drive 16.

Figure 3:
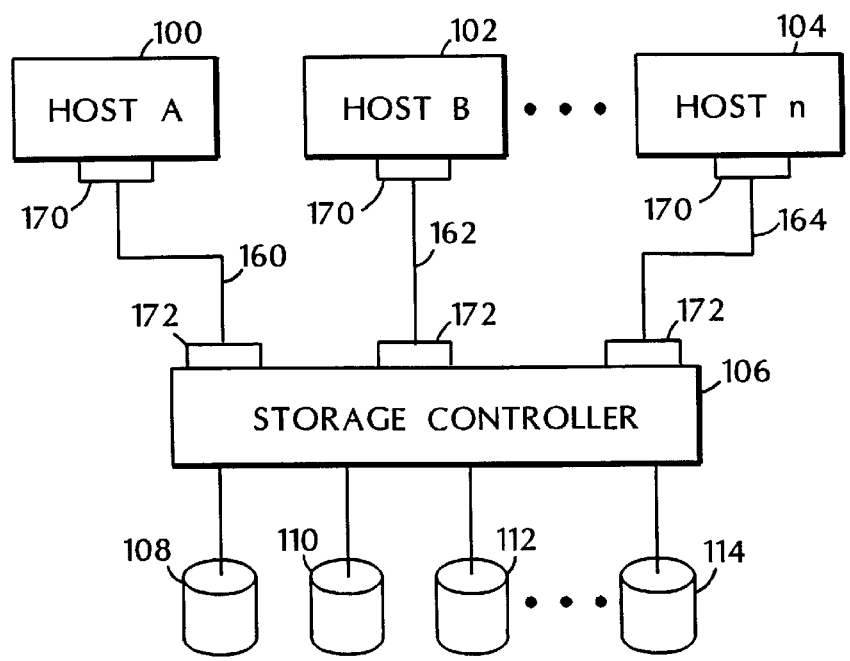
FIG. 3 is a block diagram of a storage system having a plurality of host computers and a plurality of disk drives according to the invention.
Figure 4:
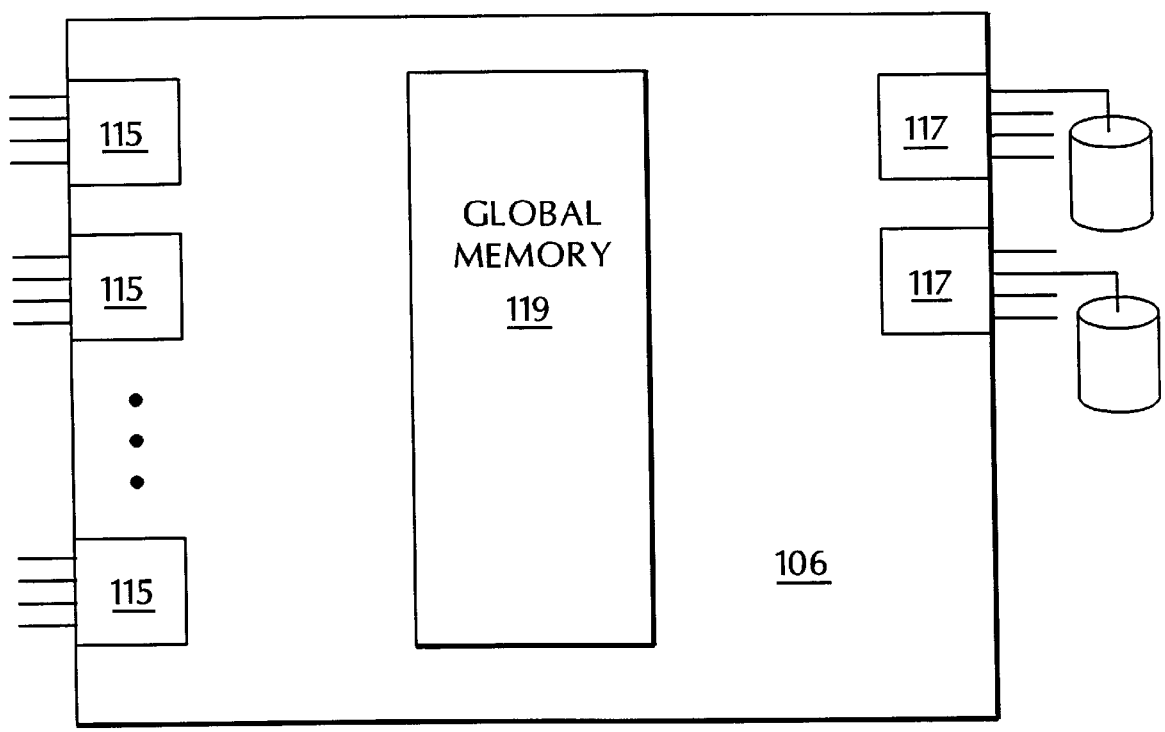
FIG. 4 is a more detailed block diagram of the disk drive controller illustrating a preferred embodiment for propagating the reset command.

As the field of mass storage devices has developed further, it has become desirable to enable a plurality of host computers, referring to FIG. 3, to communicate with a storage controller, such as the EMC Corporation Symmetrix Storage Controllers, the controller communicating with a plurality of disk drives. Thus, hosts 100, 102, . . . , 104 each connect to a storage controller 106 which in turn connects to mass storage elements, here disk drives 108, 110, 112, . . . , 114. In order to provide a maximum flexibility to the system, and to provide compatibility with a standard interface protocol, the storage controller referring to FIG. 4, preferably has a plurality of SCSI bus adapters 115, each SCSI bus adapter in the illustrated embodiment of the invention, able to communicate with up to four host computers through four separate SCSI buses. In addition, in accordance with a preferred embodiment of the storage controller, the commercially available Symmetrix storage controller, the storage controller 106 has a plurality of disk adapters, 117 each of which can connect to up to four disk drive elements. The SCSI adapters and the disk adapters communicate with each other through a global memory 119 in the storage controller, each of the adapters having access to the global memory, preferably a cache memory in accordance with a controller defined protocol.

Figure 5:
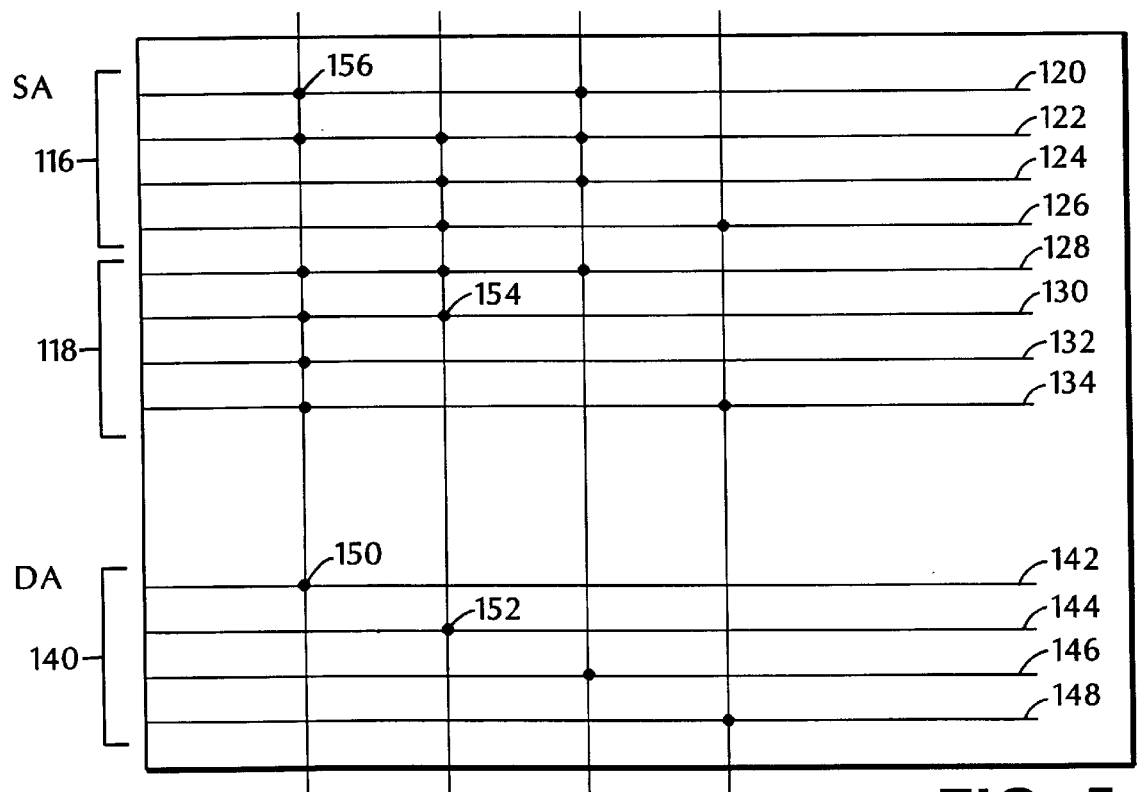
FIG. 5 is an interconnection map according to the invention.

Thus, referring to FIG. 5, there is illustrated a "connection map" in which a SCSI bus adapter 116 and a SCSI bus adapter 118 are each represented as having four connection ports 120, 122, 124, and 126 (for SCSI adapter 116) and 128, 130, 132, and 134 (for SCSI adapter 118). In a similar manner, a disk adapter 140 is illustrated as having four connection ports 142, 144, 146, and 148 to disk drives such as disk drives 108, 110, 112 and 114 respectively. The large "dots" such as dots 150, 152, 154, etc. illustrate software or hardware implemented logical connections, which in the illustrated embodiment of the invention are preferably controlled in software, to connect, for example, a host connecting at port 120 to a disk drive connected at port 142, using software implemented connections at 150 and 156. Thus, it is easy to see, that the disk drive connected at port 142 is connected to all of the hosts at SCSI adapter 118 and to two of the hosts (connected over ports 120, 122) of SCSI adapter 116. In a preferred embodiment of the invention, wherein very large disk drives, such as 1–3 Gigabyte or larger drives, might be used, the vertical reticules can represent logical volumes, several logical volumes being stored on the same physical disk drive.

Referring to FIG. 3, when the communications lines from the host to the storage controller operate according to a SCSI protocol, that is, when communication lines 160, 162, . . . , 164 operate according to a SCSI protocol, with the appropriate terminators 170 at the hosts and 172 at the storage controller, there exists a situation wherein the hosts are each connected to different SCSI paths and are not in communication with each other. In this circumstance, should a host connected to one SCSI bus issue a SCSI reset command, which returns the disk drives accessible to it to an initialization state, another host, connected to a different SCSI bus, but which has access to the same disk drive (or logical volume), will not be aware of the new state of the disk drive(s). Thus, should the host connected at port 120 issue a SCSI reset command, then the disk drive connected at port 142 will be affected and accordingly the hosts connected at ports 122, 128, 130, 132, and 134 will need to know that the reset command had been issued.

Thus, the hosts connected at ports 122, 128, 130, 132, and 134 (which each communicate over a different SCSI communications bus), will not "see" the command being given, and accordingly will not be aware that the disk drive connected at port 142 will have been reset to an initialization state. Without this information, the operations provided by those hosts may be erroneous or invalid at best and cause nonrecoverable errors at worse.

To enable a host connected over SCSI adapter 118 to recognize the issuance of the reset command by another host computer, having access to the same disk drive(s) as it does, but over a different SCSI bus, the storage controller 106 provides for two different and alternative processes. According to the first process, the storage controller, over the SCSI bus, advises the uniformed host(s) to request a SCSI Sense command from the controller. In response to the request for a SCSI Sense command (an "0629" SCSI status) the storage device provides the status information indicating that disk device(s) have been reset. (Note that in accordance with the configuration of FIG. 5, the disk devices connected over both ports 142 and 146 can be reset by a RESET command at port 120).

In operation, in accordance with the invention, therefore, and referring now to FIG. 6, the preferred embodiment of the storage controller 106 has a global memory 148 through which all data passes. The storage controller thus determines, first, which devices are affected, that is, the devices identified using, for example, the software connections 150, 152, . . . , and then which other ports (that is, hosts) can also access these devices. This is set according to the mapping illustrated in FIG. 5. The software controller then sets a semaphore for each of the host/device combinations, locking the system until all updating by the controller is effected. Thereafter, the hosts, which are constantly polling, in a main director loop, the semaphore (or mail box) area of global memory, will scan the memory, grab the "lock", read the data, clear the semaphore for the particular host, and then release "lock" so that other hosts may access the global memory. The affected host can then send a SENSE command to read the new status of the designated devices.

Accordingly, each of the hosts can be updated as described and a change of status instituted by a first host will be reflected quickly in each other host having access to the reset device.

Alternatively, the storage controller can propagate the reset condition directly, using the bitmap such as that illustrated in FIG. 5, to each other host having access to the reset device. In this process a "mailbox" approach is also used, however the flag which is set directly causing a SCSI Reset to be initiated by the storage system on the relevant SCSI bus. Clearly, if several drives are affected, many flags, as necessary, can be set, and later read. After a host computer reads a reset is issued by the storage system.

Additions, subtractions and other modifications of the disclosed and described preferred embodiments will be apparent to those of ordinary practice in the art, and are within the scope of the following claims.

What is claimed is:

1. A mass storage system comprising:
    a mass storage array having a plurality of mass storage devices,
        a storage controller for receiving commands and data over a plurality of host buses, and storing the data in the mass storage array,
        a first host for communicating data and commands over a first host communications bus connected to said storage controller at a first port,
        a second host for communicating data and commands over a second host communications bus connected to said storage controller at a second port,
        each host being able to generate a reset command to said storage controller to reset at least one storage device to which it has access, and
        said storage controller enabling any other host having access to said reset storage devices to recognize that the storage controller received a reset command from a different host to reset said storage devices.

2. The storage system of claim 1 wherein said storage controller comprises:
    a reset command response system for responding to the reset signal from one host and setting a signal for other hosts requesting that said other hosts request the status of any reset device.

3. In a mass storage system having a mass storage array having a plurality of mass storage devices and a storage controller, a method for making status information available at independent ports of the storage system comprising the steps of receiving data and commands over a first host communications bus connected to the storage controller at a first port, receiving data and commands over a second communications bus connected to the storage controller at a second port, receiving at one of said ports a reset command for resetting at least one storage device to which a host at that port has access, and enabling any other one of the hosts having access to said storage device from other ports to recognize that the storage controller received a reset command at said one port to reset said storage device, and resetting said storage device.

4. A mass storage system comprising:

a mass storage array having a plurality of mass storage devices, a storage controller for receiving commands and data over a plurality of host buses, and storing the data in the mass storage array, a first host for communicating data and commands over a first host communications bus connected to said storage controller at a first port, a second host for communicating data and commands over a second host communications bus connected to said storage controller at a second port, each host being able to generate a reset command to said storage controller to reset at least one storage device to which it has access, said storage controller enabling any other host having access to said reset storage devices to recognize that the storage controller received a reset command from a different host to reset said storage devices, and said storage controller further comprising a global memory readable from each of said first host and said second host, a flag setting control for setting at least one semaphore in said global memory indicating a host/reset device combination, said semaphore being readable by said host, and each said host polling, in a continuous periodic fashion, said storage controller to determine whether any semaphore is set.

5. In a mass storage system having a mass storage array having a plurality of mass storage devices and a storage controller, a method for making status information available at independent ports of the storage system comprising the steps of receiving data and commands over a first host communications bus connected to the storage controller at a first port, receiving data and commands over a second communications bus connected to the storage controller at a second port, receiving at one of said ports a reset command for resetting at least one storage device to which a host at that port has access, and enabling any other one of the hosts having access to said storage device from other ports to recognize that the storage controller received a reset command at said one port to reset said storage device, resetting said storage device, providing a global memory readable from each of said ports, and setting at least one semaphore in said global memory indicating a host/reset device combination, said semaphore being readable from said ports, receiving polling commands at said ports, in a continuous periodic fashion, determining in response to said polling commands, whether any semaphore is set, and responding to said polling command with a determination whether a semaphore has been set.

6. The method of claim 5 further comprising the step of responding to the reset signal from one port and setting a signal available to and readable from said other ports.

* * * * *